(12) United States Patent
Schultz

(10) Patent No.: US 6,257,544 B1
(45) Date of Patent: *Jul. 10, 2001

(54) NECKING APPARATUS SUPPORT

(75) Inventor: Robert H. Schultz, Golden, CO (US)

(73) Assignee: Coors Brewing Company, Golden, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/004,727

(22) Filed: Jan. 8, 1998

Related U.S. Application Data

(63) Continuation of application No. 08/686,209, filed on Jul. 23, 1996, now Pat. No. 5,785,294, which is a continuation of application No. 08/438,894, filed on May 10, 1995, now Pat. No. 5,553,826.

(51) Int. Cl.⁷ .............................. F16M 1/00; B21B 45/02
(52) U.S. Cl. ..................... 248/678; 248/346.01; 108/64; 72/43
(58) Field of Search ........................... 248/34.01, 346.07, 248/676, 678, 346.02, 639; 108/50, 64, 153, 180, 185; 72/94, 354.6, 356, 361, 379.4, 405.03; 413/69; 198/608

(56) References Cited

U.S. PATENT DOCUMENTS

| | | | | |
|---|---|---|---|---|
| 493,441 | * | 3/1893 | Munz | 108/185 |
| 936,598 | | 10/1909 | Brenzinger . | |
| 1,970,705 | * | 8/1934 | Montigney | 410/31 |
| 2,294,855 | * | 9/1942 | Thomason | 248/544 |
| 2,709,954 | * | 6/1955 | Baker | 108/50 |
| 3,483,722 | | 12/1969 | Fink | 72/94 |
| 3,581,542 | | 6/1971 | Wahler et al. | 72/94 |
| 3,635,069 | | 1/1972 | Eickenhorst | 72/349 |
| 3,847,458 | * | 11/1974 | Nowak | 108/180 |
| 4,336,677 | * | 6/1982 | Ossbahr | 248/678 |
| 4,446,714 | * | 5/1984 | Cvacho | 72/348 |
| 4,513,595 | | 4/1985 | Cvacho | 72/43 |
| 4,732,027 | * | 3/1988 | Traczyk et al. | 413/69 |
| 4,785,945 | * | 11/1988 | Rowse et al. | 108/64 |
| 5,497,816 | * | 3/1996 | Darland | 248/676 |
| 5,611,231 | * | 3/1997 | Marritt et al. | 72/94 |

* cited by examiner

Primary Examiner—Anita M. King
(74) Attorney, Agent, or Firm—William P. O'Meara; Michael A. Goodwin; Klaas, Law, O'Meara & Malkin, P.C.

(57) ABSTRACT

Modular supports for supporting a plurality of necking-in stations and a plurality of transfer stations wherein each of the modular supports has a base that is releasably secured to an adjacent base, at least two spaced apart support columns; a first support plate supported on and secured to the at least two spaced apart columns for supporting a necking-in station and a second support plate secured to first support plate for supporting a transfer station.

20 Claims, 3 Drawing Sheets

NECKING APPARATUS SUPPORT

This application is a continuation of application Ser. No. 08/686,209 filed Jul. 23, 1996 now U.S. Pat. No. 5,785,294 which is a continuation of application Ser. No. 08/438,894 filed May 10, 1995, now U.S. Pat. No. 5,553,826, which are both hereby incorporated by reference for all that is disclosed therein.

FIELD OF THE INVENTION

This invention relates generally to the necking-in of tubular members, such as can body members, and more specifically to modular supports for units of a necking-in apparatus.

BACKGROUND OF THE INVENTION

In the manufacture of tubular members, such as can body members, it is necessary to neck-in the open end portion of the tubular member. Also, the number of times a tubular member must be passed through a necking-in operation depends on the desired shape of the necked-in portion. Sometimes the desired shape can be obtained in one necking-in operation and other times the desired shape requires a plurality of necking-in operations. Therefore, it is desirable to provide necking-in apparatus that can be readily modified to provide for one or more necking operations. U.S. Pat. No. 4,446,714 provides necking-in apparatus in modular form so that the necking-in apparatus can be modified to provide for one or more necking-in operations. Such modular apparatus require a support that can readily be used to make the desired modifications.

BRIEF DESCRIPTION OF THE INVENTION

This invention provides a plurality of modular supports so that the number of necking-in stations for a necking-in apparatus can be readily changed.

In a preferred embodiment of the invention a plurality of modular supports are arranged in a side-by-side relationship wherein each of the plurality of modular supports comprises a hollow elongated longitudinally extending base, each having at least a top wall, opposite sidewalls and opposite channel shaped end walls. The opposite sidewalls are secured to the ends of the channel shaped end walls and have space apart opening adjacent each end thereof. The top wall is secured to the opposite sidewalls and to the channel shaped end member. Releasable securing means are provided for releasably securing together the adjacent sidewalls of adjacent bases. At least two spaced apart support columns are secured to and project from the top wall. A first elongated longitudinally extending support plate is supported on and secured to the at least two spaced apart support columns and is used to support at least one necking-in station. A second elongated longitudinally extending support plate for supporting at least one transfer station is supported on at least a portion of the first elongated longitudinally extending support plate and has a longitudinal extent substantially less than the longitudinal extent of the first elongated longitudinally extending support plate. Support means are provided and comprise at least two opposite sidewalls, two opposite end walls and a bottom wall secured to and projecting from the second elongated longitudinally extending support plate in a direction toward the hollow elongated longitudinally extending base. The opposite sidewalls have flange portions that extend past the opposite end walls and have openings therein so that the flange portions may be secured to at least one of the at least two spaced apart support columns by passing headed threaded bolts through the openings in the flange portions and securing them in threaded openings in the one support column. A damaged can deflector is also provided.

BRIEF DESCRIPTION OF THE DRAWING

An illustrative and presently preferred embodiment of the invention is shown in the accompanying drawing in which.

DETAILED DESCRIPTION OF THE INVENTION

Figure 1:
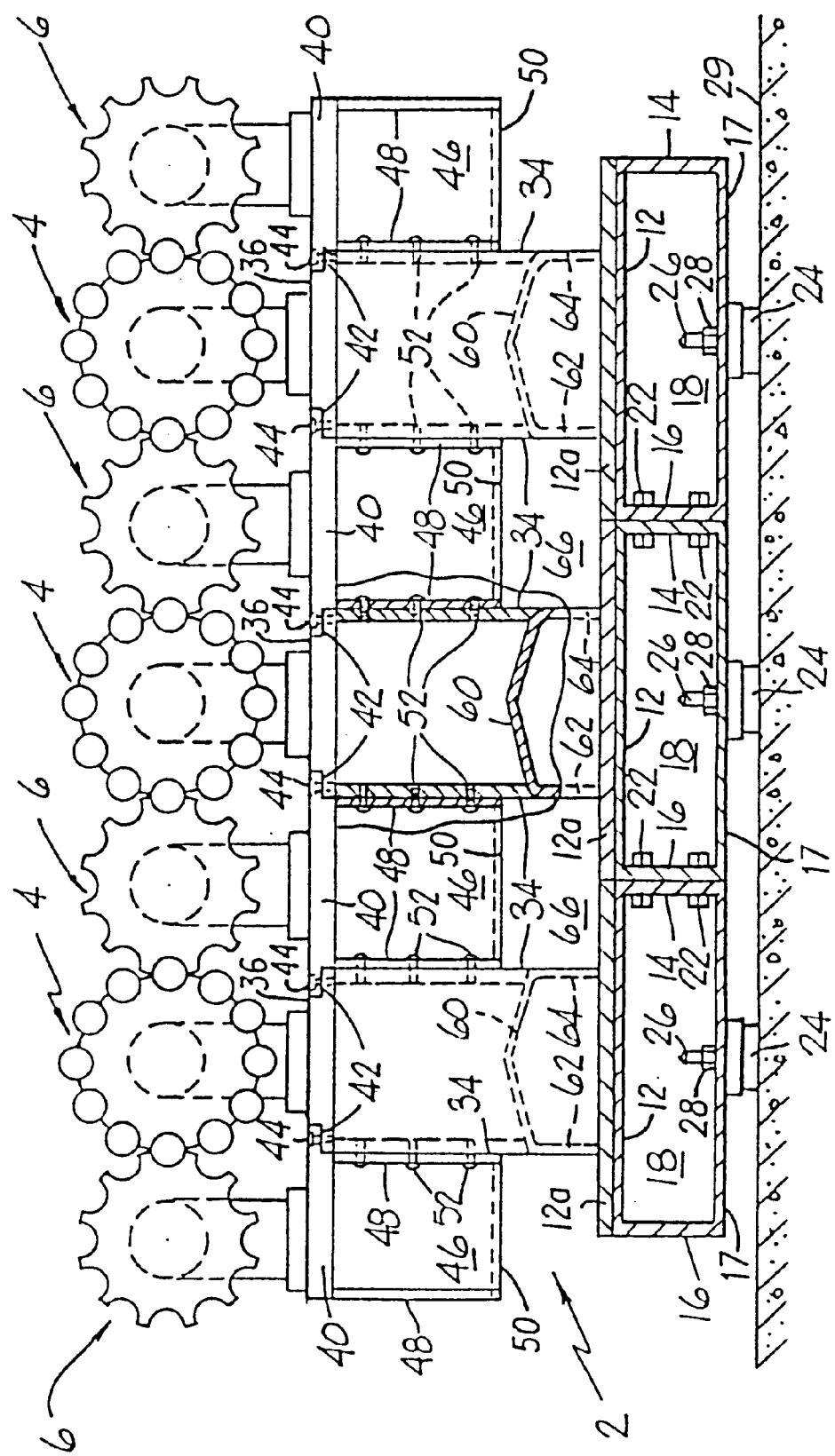
FIG. 1 is a front elevational view with parts in section and parts schematically illustrated.

In FIG. 1, there is illustrated a modular support 2 for supporting a plurality of necking-in stations 4 comprising conventional apparatus for providing a necked-in portion adjacent the open end of a can body and a plurality of transfer stations 6 comprising conventional transfer apparatus for receiving unnecked-in can bodies transferring the can bodies through the necking-in stations and feeding the necked-in can bodies to a conveyor (not shown).

Each modular support 2 has a hollow elongated longitudinally extending base 10 having a top wall 12, opposite sidewalls 14 and 16, bottom wall 17 and opposite channel shaped end walls 18. The opposite sidewalls 14 and 16 are secured to the opposite ends of the channel shaped end walls 18 by suitable means such as by welding. The top wall 12 includes a plate 12a mounted thereon with opposite end portions thereof superposed over the associated sidewalls 14 and 16. The top wall 12 is secured to the opposite sidewalls 14 and 16 and the channel shaped end walls 18 by suitable means, such as by welding. Each of the opposite sidewalls 14 and 16 have spaced apart openings 20 adjacent to the end portions thereof so that adjacent bases 10 may be joined together by nuts and bolts 22 passing through the openings 20. Each base 10 has two vibration absorbing pads 24 which are secured to the opposite channel spaced end walls 18 by a threaded projection 26 passing through openings in the lower leg of the channel shaped end walls 18 and secured thereto by threaded nuts 28 for supporting each base 10 on a fixed surface 29. The channel shaped end walls 18 are preferably made from a mild steel having a thickness of about 0.50 inch. The top wall 12 and the sidewalls 14 and 16 are preferably formed from a mild steel having a thickness of about 1.00 inch.

Figure 2:
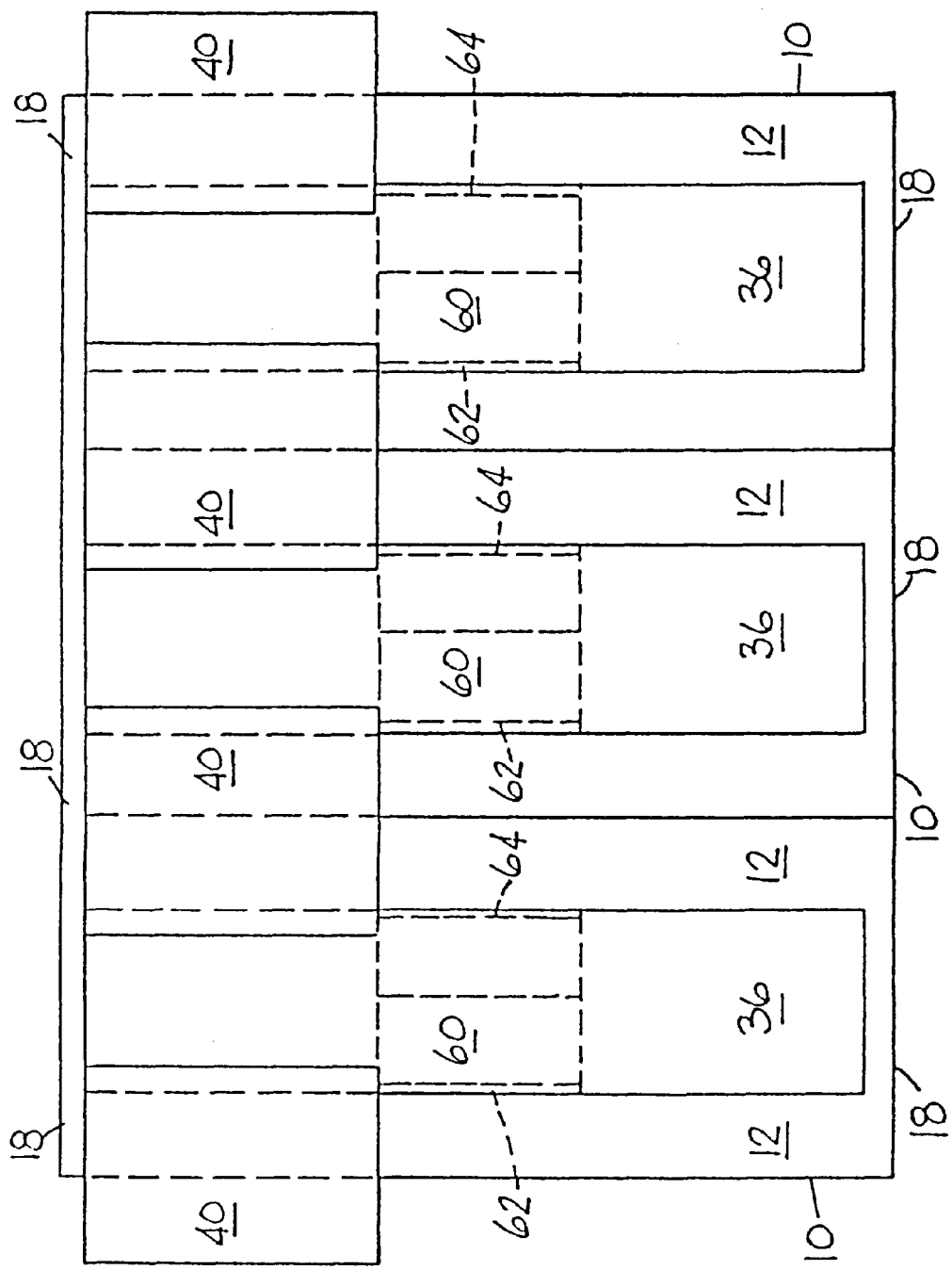
FIG. 2 is a top plan view of FIG. 1 with parts removed.
Figure 3:
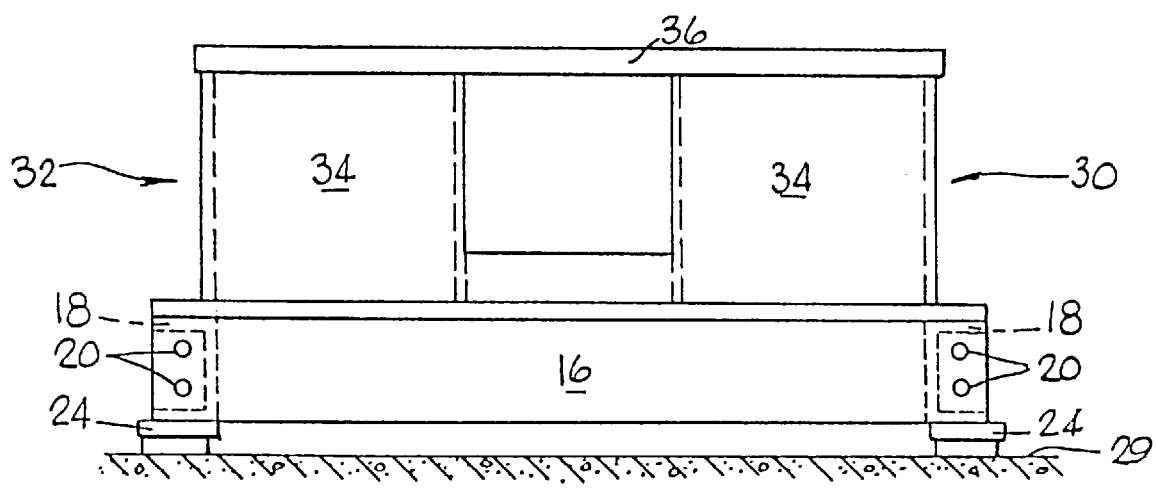
FIG. 3 is an end elevational view taken from the left side of FIG. 2.

A pair of spaced apart support columns 30 and 32 have four sidewalls 34 secured to each other in a right angular relationship by suitable means, such as by welding. The sidewalls 34 are preferably formed from a mild steel having a thickness of about 0.05 inch. Each of the support columns 30 and 32 project upwardly from the plate 12a and are secured thereto by suitable means, such as by welding. First elongated longitudinally extending support plates 36 are supported by the support columns 30 and 32 and are secured to them by suitable means, such as by welding. The necking-in stations 4 are mounted on the first elongated longitudinally extending support plates 36. As illustrated in FIGS. 2 and 3, the first elongated longitudinally extending support plates 36 have a longitudinal extent less than the longitudinal extent of the top walls 12.

Second elongated longitudinally extending support plates 40, having a longitudinal extent less than the longitudinal extent of the first elongated longitudinally extending support plates 36, are mounted on and secured to the first elongated longitudinally extending support plates 36 using a straight splice joint 42 and threaded bolts 44. Opposite end walls 46 and opposite sidewalls 48 are joined together in a right angle relationship by suitable means, such as by welding and to each of the second elongated longitudinally extending supports 40 by suitable means, such as by welding. A bottom wall 50 is secured to the end walls 46 and sidewalls 48 by suitable means, such as by welding. Each of the sidewalls 48 have flange portions projecting outwardly pass the end walls 46 so that the sidewalls 48 can be secured to the sidewalls 34 by suitable means, such a threaded bolts 52 passing through openings in the flange portions and threaded into threaded openings in the sidewalls 34. The first and second elongated longitudinally extending support plates are preferably formed from a mild steel having a thickness of about 1.50 inches.

A damaged can body deflector having a angle shaped top wall 60 and opposite sidewalls 62 and 64 is secured to facing sidewalls 34 by suitable means, such as by welding to deflect damaged can bodies falling from the transfer stations 6 into the space 66.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed:

1. A method of supporting a necking apparatus comprising a plurality of necking stations during operation thereof, wherein said method comprises:
    providing a first modular support;
    locating a second modular support adjacent said first modular support;
    supporting a first necking station on said first modular support;
    supporting a second necking station on said second modular support; and
    securing said first modular support to said second modular support.

2. The method of claim 1 wherein said securing said first modular support to said second modular support comprises releasably securing said first modular support to said second modular support.

3. The method of claim 1 wherein:
    said first modular support includes a first modular support base portion; and
    said second modular support includes a second modular support base portion.

4. The method of claim 3 wherein said securing said first modular support to said second modular support comprises securing said first modular support base portion to said second modular support base portion.

5. The method of claim 3 wherein:
    said first modular support base portion includes at least one first modular support base portion sidewall member;
    said second modular support base portion includes at least one second modular support base portion sidewall member; and
    said securing said first modular support to said second modular support comprises securing said first modular support base portion sidewall member to said second modular support base portion sidewall member.

6. The method of claim 1 wherein:
    said first modular support includes at least one first modular support support column;
    said second modular support includes at least one second modular support support column;
    said supporting a first necking station on said first modular support comprises supporting said first necking station on said first modular support support column; and
    said supporting a second necking station on said second modular support comprises supporting said second necking station on said second modular support support column.

7. The method of claim 6 wherein:
    said first modular support includes a first modular support deflection member located adjacent said at least one first modular support support column; and
    said second modular support includes a second modular support deflection member located adjacent said at least one second modular support support column.

8. The method of claim 6 wherein each of said first and second modular support support columns has at least a first pair of opposite sidewalls and at least a second pair of opposite sidewalls.

9. The method of claim 1 wherein said securing said first modular support to said second modular support comprises directly attaching said first modular support to said second modular support.

10. Modular supports for supporting a plurality of necking stations comprising:
    at least a first modular support and a second modular support in a side-by-side relationship;
    each of said first and second modular supports comprising:
        a base portion; and
        at least one support column projecting upwardly from said base portion;
    wherein said first modular support is secured to said second modular support.

11. The modular supports of claim 10 wherein each of said first and second modular supports further comprises a deflection member located adjacent said at least one support column.

12. The modular supports of claim 10 wherein said base portion of said first modular support is secured to said base portion of said second modular support.

13. The modular supports of claim 10 wherein said first modular support is releasably secured to said second modular support.

14. The modular supports of claim 10 wherein said at least one support column has at least a first pair of opposite sidewalls and at least a second pair of opposite sidewalls.

15. The modular supports of claim 10 wherein said base portion of said first modular support is secured to said base portion of said second modular support.

16. The modular supports of claim 10 wherein:
    said base portion of said first modular support includes at least one first modular support base portion sidewall member;
    said base portion of said second modular support includes at least one second modular support base portion sidewall member; and
    said first modular support base portion sidewall member is secured to said second modular support base portion sidewall member.

17. The modular supports of claim 10 wherein:
    said first modular support includes at least one first modular support support column and at least one first necking station supported by said at least one first modular support support column;

said second modular support includes at least one second modular support support column and at least one second necking station supported by said at least one second modular support support column.

18. The modular supports of claim 17 wherein:

said first modular support includes a first modular support deflection member located adjacent said at least one first modular support support column; and said second modular support includes a second modular support deflection member located adjacent said at least one second modular support support column.

19. The modular supports of claim 17 wherein each of said first and second modular support support columns has at least a first pair of opposite sidewalls and at least a second pair of opposite sidewalls.

20. The modular supports of claim 10 wherein said first modular support is directly attached to said second modular support.

* * * * *